March 14, 1961
G. H. RICHARDSON
2,974,615
SCOOP AND DISPENSER FOR FORMING AND DISPENSING
A TRIANGULARLY-SHAPED QUANTITY OF MATERIAL
Filed March 14, 1960
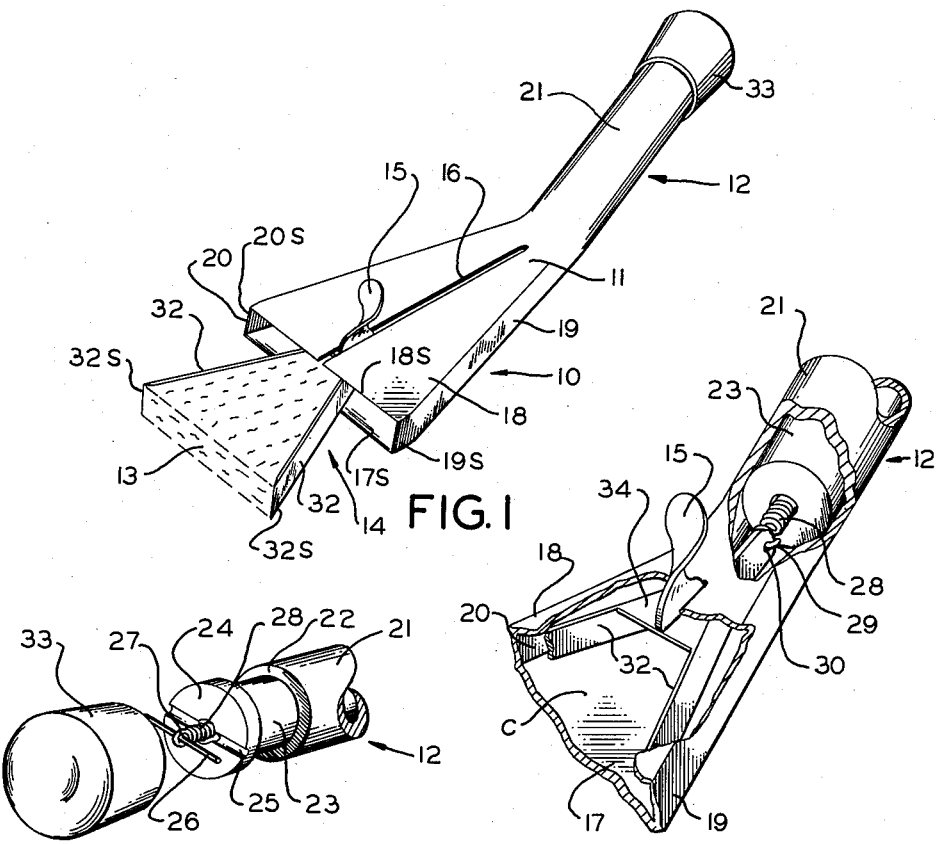
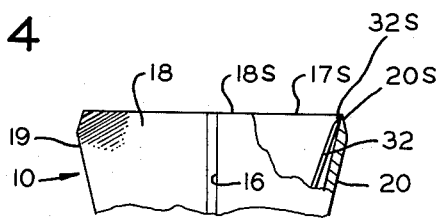
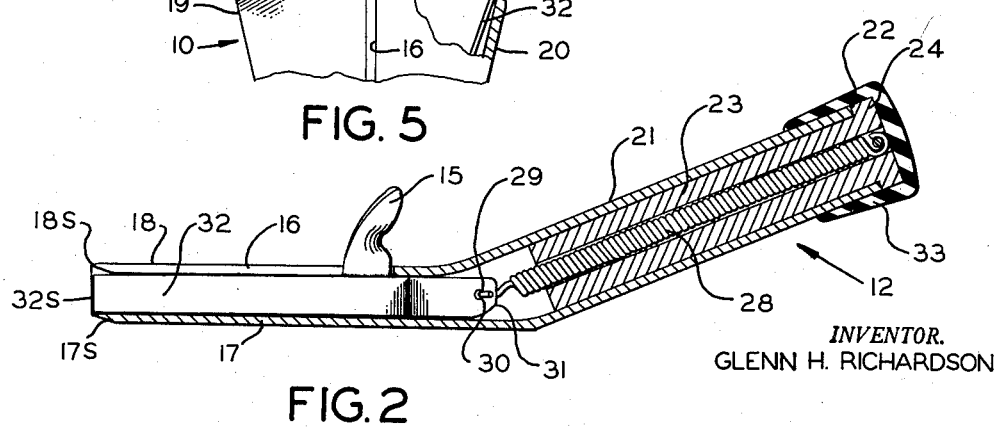
INVENTOR.
GLENN H. RICHARDSON

United States Patent Office 2,974,615
Patented Mar. 14, 1961

2,974,615
SCOOP AND DISPENSER FOR FORMING AND DISPENSING A TRIANGULARLY-SHAPED QUANTITY OF MATERIAL

Glenn H. Richardson, 7305 Winnetka, Minneapolis, Minn.

Filed Mar. 14, 1960, Ser. No. 14,602

1 Claim. (Cl. 107—48)

The present invention consists of a scoop and dispenser for forming and dispensing a substantially triangularly-shaped quantity of material—usually a serving of food material, which may comprise frozen food material such as ice cream, ice milk, or the like, although not specifically so limited. The invention is particularly adapted for use in forming and dispensing such ice cream or ice milk in the form of a triangularly-shaped slab of substantially uniform thickness of a size and shape suitable to be dispensed by the dispenser on the top surface of a substantially sector-shaped cut of pie, or the like, whereby to produce what is commonly known as "pie a la mode."

It is an object of the present invention to provide an improved scoop and dispenser of the character referred to above, including a forwardly open hollow scoop portion consisting of a triangular, substantially flat lower wall member, a triangular, substantially flat upper wall member, and rearwardly converging side wall members interconnecting outer edges of said lower and upper wall members, with said lower and upper wall members and with the rear end of said hollow scoop portion being provided with a handle portion, and with the hollow interior of the hollow scoop portion being provided with manually controllably operable dispenser means comprising substantially V-shaped forwardly open blade means converging toward the rear and provided with exteriorly accessible actuating means for slidably moving said dispenser means forwardly toward the forward open end of said hollow scoop portion and rearwardly back into nested relationship within said hollow scoop portion.

It is a further object to provide a scoop and dispenser of the character set forth in the preceding object, wherein the exteriorly accessible actuating means comprises a handle projecting upwardly through longitudinal slot means provided in the upper wall member of the hollow scoop portion.

It is a further object to provide a scoop and dispenser of the character set forth above, including biasing means such as spring means, or the like, normally biasing said dispenser means into fully retracted position within the hollow scoop portion but allowing the dispenser means to be moved into dispensing position against the action of said biasing means.

It is a further object to provide a scoop and dispenser of the character set forth above, adapted for use in forming a substantially triangularly-shaped slab of ice cream, ice milk, or the like, and for controllably dispensing same onto the generally similar sector-shaped top surface of a piece of pie whereby to produce what is known as "pie a la mode."

It is a further object to provide a scoop and dispenser of the character set forth above, wherein all of the parts may be quickly and easily disassembled to facilitate ease in cleaning the device, which is extremely important in a device adapted to dispense food material such as ice cream, ice milk, or the like.

It is a further object to provide an improved scoop and dispenser of the character set forth in any of the preceding objects, which is of extremely simple, cheap, foolproof construction such as to be conducive to widespread use of the device.

Further objects will be apparent to persons skilled in the art after a careful study hereof.

For the purpose of clarifying the nature of the present invention, one exemplary embodiment is illustrated in the hereinbelow-described figures of the accompanying single drawing sheet and is described in detail hereinafter.

Fig. 1 is a reduced-size perspective view showing one exemplary embodiment of the scoop and dispenser of the present invention with the dispenser means in forward dispensing position adapted to dispense a triangularly-shaped slab of ice cream, such as onto the generally similarly shaped top surface of a sector-shaped piece of pie (not shown).

Fig. 2 is a central longitudinal sectional view through the device with the biasing spring shown in side elevation and the forwardly open V-shaped blade means comprising the dispenser means also being shown in side elevation and in the fully retracted position.

Fig. 3 is a fragmentary partly broken away perspective view of the portion of the apparatus shown in Fig. 1 adjacent the rear end of the hollow scoop portion where it joins the forward end of the handle portion. The partially broken away parts show the connection of the biasing spring means to the rear end of the forwardly open V-shaped blade means comprising the dispenser means, which is in the fully retracted position.

Fig. 4 is a fragmentary exploded view of the upper end of the handle portion showing the hollow cylindrical outer sleeve slidably carrying therein an insert member having an enlarged shoulder at the outer end thereof and to which the outer end of the biasing spring means is fastened by cross-pin means, and additionally shows the covering cap member in exploded relationship with respect to the rest of the handle structure.

Fig. 5 is a fragmentary top plan view of the forward part of the hollow scoop portion with a small piece of the upper triangular wall member being broken away to show the normal relationship of the sharpened forward edges of the blade means with respect to the sharpened forward edges of the side walls of the hollow scoop portion.

Referring to the figures for exemplary purposes, one illustrative embodiment of the invention takes a typical exemplary form wherein it comprises a forwardly open hollow scoop portion, indicated generally at 10, converging toward the rear end 11 thereof, which is provided with a handle portion, indicated generally at 12, adapted to be manually grasped when the device is to be used for purposes of forming and dispensing a suitable food material, which may comprise frozen food material such as ice cream, ice milk, or the like, as indicated at 13, which is accomplished by means of manually controllably operable dispenser means, indicated generally at 14, which is provided with exteriorly accessible actuating means, such as the actuating tab 15 projecting upwardly through longitudinal slot means 16, whereby to facilitate extension and retraction of the dispenser means 14 with respect to the forwardly open hollow scoop portion 10.

In the specific example illustrated, the hollow scoop portion 10 consists of a triangular substantially flat lower wall member 17 converging toward the rear end 11 of the hollow scoop portion 10, a triangular substantially flat upper wall member 18 generally similar in shape to the lower wall member 17 and centrally longitudinally and forwardly provided with the above-mentioned slot means 16, with rearwardly converging side edges of the lower and upper triangular wall members 17 and 18 being connected by substantially rectangular rearwardly converging side wall members 19 and 20 whereby to effectively define within the hollow interior of the hollow scoop portion 10 a substantially triangular chamber C of a predetermined substantially uniform vertical thickness. It should also be noted that forward edges of the lower wall 17, the upper wall 18, and the side walls 19 and 20 are sharpened as indicated, respectively, at 17S, 18S, 19S, and 20S, whereby to facilitate the forward insertion into a quantity of ice cream, ice milk, or the like. It should also be noted that said sharpened forward edges define a substantially rectangular forwardly directed opening at the front of the hollow scoop portion 10.

It should be noted that in the specific example illustrated, the handle portion indicated generally at 12 comprises a hollow substantially cylindrical sleeve 21 having an open end 22 which receives therein a cylindrical longitudinal insert member 23 having an enlarged shoulder 24 which abuts the end 22 of the cylindrical sleeve 21.

In the specific example illustrated, the enlarged shoulder or head 24 of the insert member 23 carries a transverse groove 25 adapted to receive a retaining pin 26 passed through the end 27 of a biasing tension spring 28, which has its opposite end 29 connected through an aperture 30 to the rear apex end 31 of the forwardly open V-shaped blade means 32 comprising the dispenser means, indicated generally at 14, whereby to normally bias said dispenser means 14 into the fully retracted position shown in Figs. 2 and 3. The enlarged shoulder or head 24 of the insert member 23 is normally adapted to be covered by a covering cap member 33, which may be of resilient elastomeric material adapted to be easily removed for disassembly of the entire device for cleaning purposes.

The forwardly open blade means 32 have laterally spaced sharpened forward edges 32S and have a structural panel member 34 positioned just forwardly of the rear apex 31 whereby to provide strength and rigidity to the entire dispenser means 14 and also whereby to provide means for attaching the actuating tab 15 to the dispenser means 14.

The operation of the device may be briefly described as follows.

The handle portion 12 is grasped, with the dispenser means 14 in fully retracted position as shown in Figs. 2, 3, and 5. Then the forward open end of the hollow scoop portion 10 and also the forwardly open portion of the blade means 32 of the dispenser means 14 are forced into a quantity of ice cream, ice milk, or the like, until the hollow interior of the scoop portion 10 is full. Then the device is moved into a position superimposed over a substantially sector-shaped piece of pie (not shown) and the actuating tab 15 is forwardly moved along the slot 16 in the manner shown in Fig. 1 until the triangularly-shaped serving of ice cream, ice milk, or the like, indicated at 13, is in a position adapted to be dropped onto the top surface of the pie in a superimposed "pie a la mode" relationship thereto.

It should be noted that, in a preferred form, the various parts of the apparatus of the present invention are made of materials readily adapted for cleaning and/or sterilization, such as stainless steel and high-temperature-resistant rubber or plastic for the covering cap 33.

It should be understood that the figures and the specific description thereof set forth in this application are for the purpose of illustrating the present invention and are not to be construed as limiting the present invention to the precise and detailed specific structure shown in the figures and specifically described hereinbefore. Rather, the real invention is intended to include substantially equivalent constructions embodying the basic teachings and inventive concept of the present invention.

I claim:

A frozen food scoop and dispenser for forming and dispensing a substantially triangularly-shaped serving of frozen food material suitable for placing on a sector-shaped piece of pie to produce pie a la mode, comprising: a forwardly open hollow scoop portion consisting of a triangular substantially flat lower wall member, a triangular substantially flat upper wall member spaced above said lower wall member a predetermined distance, and substantially rectangular side wall members vertically interconnecting outer edges of said lower and upper wall members, said lower and upper triangular wall members each terminating at the front thereof in a transverse sharpened triangle-base edge, and each of said side wall members terminating at the front thereof in a sharpened vertical edge interconnecting said sharpened triangle-base edges of said lower and upper wall members, with said side wall members converging toward the rear end of said hollow scoop portion; the rear end of said hollow scoop portion being provided with a hollow substantially cylindrical handle portion extending rearwardly and upwardly therefrom into a conveniently accessible manually graspable position above the plane of the hollow scoop portion, said hollow cylindrical handle portion having an insert member forwardly inserted therethrough and provided with an enlarged shoulder abutting the end of said handle portion whereby to prevent further forward movement of said insert member and being provided with covering cap means covering the rear end of said insert member and said handle portion; said hollow scoop portion being provided with manually controllably operable dispenser means comprising substantially V-shaped forwardly open blade means having forward laterally spaced sharpened edges and rear ends integrally interconnected to form a rear apex, said blade means being forwardly and rearwardly slidably mounted within the similarly-shaped hollow scoop portion and being provided with exteriorly accessible actuating means for slidably moving said blade means forwardly out of the forward open end of said scoop and rearwardly back into nested relationship therein immediately inside of and against said side wall members, said exteriorly accessible actuating means comprising an actuating handle projecting upwardly through longitudinal slot means provided in said top wall member of said hollow scoop portion; and biasing spring means normally spring-biasing said dispenser means into fully retracted position within the hollow scoop portion, said biasing spring means comprising a longitudinal tension spring having one end connected to the rear apex of said blade means and having the other end fixedly connected with respect to the outer end of said handle insert member immediately under said covering cap means.

References Cited in the file of this patent

UNITED STATES PATENTS

| | | |
|---|---|---|
| 693,360 | Bahl | Feb. 18, 1902 |
| 1,798,490 | Parr | Mar. 31, 1931 |
| 2,154,806 | Clave et al. | Apr. 18, 1939 |